United States Patent

Frykhult

[11] Patent Number: 5,685,983
[45] Date of Patent: Nov. 11, 1997

[54] APPARATUS FOR FILTERING LIQUIDS CONTAINING PARTICLES

[75] Inventor: Siri Elly Viktoria Frykhult, Huddinge, Sweden

[73] Assignee: Nordic Water Products AB, Nynashamn, Sweden

[21] Appl. No.: 564,039

[22] PCT Filed: Jul. 4, 1994

[86] PCT No.: PCT/SE94/00660

§ 371 Date: Dec. 12, 1995

§ 102(e) Date: Dec. 12, 1995

[87] PCT Pub. No.: WO95/01825

PCT Pub. Date: Jan. 19, 1995

[30] Foreign Application Priority Data

Jul. 6, 1993 [SE] Sweden .................... 9302326
Sep. 7, 1993 [SE] Sweden .................... 9302883

[51] Int. Cl.⁶ .................... B01D 33/11; B01D 33/13; B01D 33/76
[52] U.S. Cl. .................... 210/393; 210/394; 210/403
[58] Field of Search .................... 210/403, 394, 210/393, 331, 333.01, 333.1, 334

[56] References Cited

U.S. PATENT DOCUMENTS

| | | |
|---|---|---|
| 1,217,207 | 2/1917 | North . |
| 1,712,258 | 5/1929 | Compain . |
| 2,014,144 | 9/1935 | Mensing . |
| 2,148,903 | 2/1939 | Garnsey . |
| 2,242,861 | 5/1941 | Reene . |
| 2,450,522 | 10/1948 | North . |
| 2,653,521 | 9/1953 | Ahlfors . |
| 2,758,722 | 8/1956 | Murray . |
| 2,765,915 | 10/1956 | Nilsson . |
| 2,891,671 | 6/1959 | Nilsson . |
| 3,163,601 | 12/1964 | Ericson . |
| 3,278,039 | 10/1966 | Nilsson . |
| 3,979,289 | 9/1976 | Bykowski . |
| 4,038,187 | 7/1977 | Saffran . |
| 4,198,299 | 4/1980 | Ewing . |
| 4,620,927 | 11/1986 | Casper . |
| 4,705,631 | 11/1987 | Hautala . |
| 4,724,007 | 2/1988 | Uchiyama . |
| 4,869,823 | 9/1989 | Otani . |
| 4,921,602 | 5/1990 | Froderberg . |
| 5,139,670 | 8/1992 | Hirs . |

FOREIGN PATENT DOCUMENTS

| | | |
|---|---|---|
| 293350 | 11/1988 | European Pat. Off. . |
| 2300602 | 10/1976 | France . |
| 1 175 651 | 8/1964 | Germany . |
| 2461663 | 7/1975 | Germany . |
| 2-078406 | 3/1990 | Japan . |
| 1008617 | 10/1965 | United Kingdom . |

Primary Examiner—Thomas M. Lithgow
Attorney, Agent, or Firm—Young & Thompson

[57] ABSTRACT

An apparatus for filtering liquids, such as fiber suspensions or polluted water, includes a hollow rotating filter body adapted to receive the liquid to be filtered within the body. A plurality of guide members are attached to the filter body and distributed around the latter to receive cloudy filtrate penetrating the filter body at the descending side. A basin is arranged at the descending side of the filter body to collect cloudy filtrate poured from the guide members. As a result, the cloudy filtrate is prevented from mixing with the clear filtrate.

5 Claims, 3 Drawing Sheets

APPARATUS FOR FILTERING LIQUIDS CONTAINING PARTICLES

FIELD OF THE INVENTION

The present invention relates to an apparatus for filtering liquids containing particles including a hollow body having walls of filter material, and drive means arranged to rotate the hollow body such that the walls of filter material are rotated about a substantially horizontal axis. Inlet means is adapted to supply the liquid to be filtered to the interior of the hollow body. Means is provided for maintaining a pool of the liquid in the hollow body, such that the pool has a free surface situated below a top portion of the filter material. A basin is arranged at the descending side of the hollow body. Guide means is arranged to guide cloudy filtrate penetrating the descending side of the rotating hollow body to the basin. There is an outlet from the basin for discharging cloudy filtrate. Means is provided for removing particles from said top portion of the filter material and for discharging the removed particles out of the hollow body.

BACKGROUND OF THE INVENTION

An apparatus of this type is known from the British Patent No. 1008617 and the Swedish Patent No. 224131, and has the advantage that cloudy filtrate, which develops initially when clean filter material descends below the free surface of the liquid pool in the hollow body, is prevented from mixing with the more clear filtrate, which develops when particles have accumulated on the filter material to form a filter layer. The cloudy filtrate can be fed back to the interior of the hollow body to be refiltered.

The prior art apparatus according to said British patent comprises a hollow body in the form of a circular drum having its mantle covered with filter material. The guide means comprises a stationary shielding device extending along the mantle.

The prior art apparatus according to said Swedish patent comprises a hollow body in the form of a number of connected hollow discs having annular side walls of filter material. The guide means comprises a stationary comb-shaped device, the teeth of which extend in between the discs. These teeth may be provided with sealing lips of rubber abutting against the side walls of filter material, such that the lips are dragged along the discs as the latter rotate.

A problem of the British and the Swedish apparatus is that some cloudy filtrate inevitably escapes through the gap formed between the moving filter material and the stationary device, and mixes with clear filtrate. The sealing lips of the Swedish apparatus would not be a good solution to this problem, because they would give rise to another problem, namely that the filter material, which often comprises cloth material, would be damaged or worn by said lips. Also, the energy consumption for rotating the discs would increase, because of the frictional resistance occurring between the filter material and the lips.

SUMMARY OF THE INVENTION

The object of the present invention is to improve the above described prior art apparatus so that a more clear filtrate is obtainable without the use of any sealing means dragging along the filter material.

This object is fulfilled by means of a filtering device of the type discussed above, which is characterized in that the guide means comprises a plurality of guide members attached to the hollow body and distributed about said axis.

It is preferred to distribute the guide members evenly about said axis and to select the number of the guide members in the range of 10 to 36.

Each guide member is adapted to receive cloudy filtrate from a descending portion of the filter material defined by the guide member and an upper adjacent member, and is positioned on the hollow body such that cloudy filtrate received by the guide member as the latter descends flows by gravity along the guide member in a direction outwardly from the hollow body.

The basin is suitably positioned relative to the hollow body such that it receives cloudy filtrate which is poured from a descending guide member.

Each guide member has at least a portion extending radially outwardly from the hollow body, whereby the cloudy filtrate easier can reach the basin.

To ensure that substantially all of the cloudy filtrate developing on the filter material reaches the basin, a flexible wall member may extend from the basin into an annular zone, along which said portions of the guide members are displaced as the hollow body rotates, said wall member being adapted to be bent aside by a passing guide member.

BRIEF DESCRIPTION OF THE DRAWINGS

The apparatus of the invention is particularly suited for filtering polluted water or fibre suspensions.

The invention is explained below in more detail by way of example with reference to the accompanying drawings, in which.

DETAILED DESCRIPTION OF THE DRAWINGS

Figure 1:
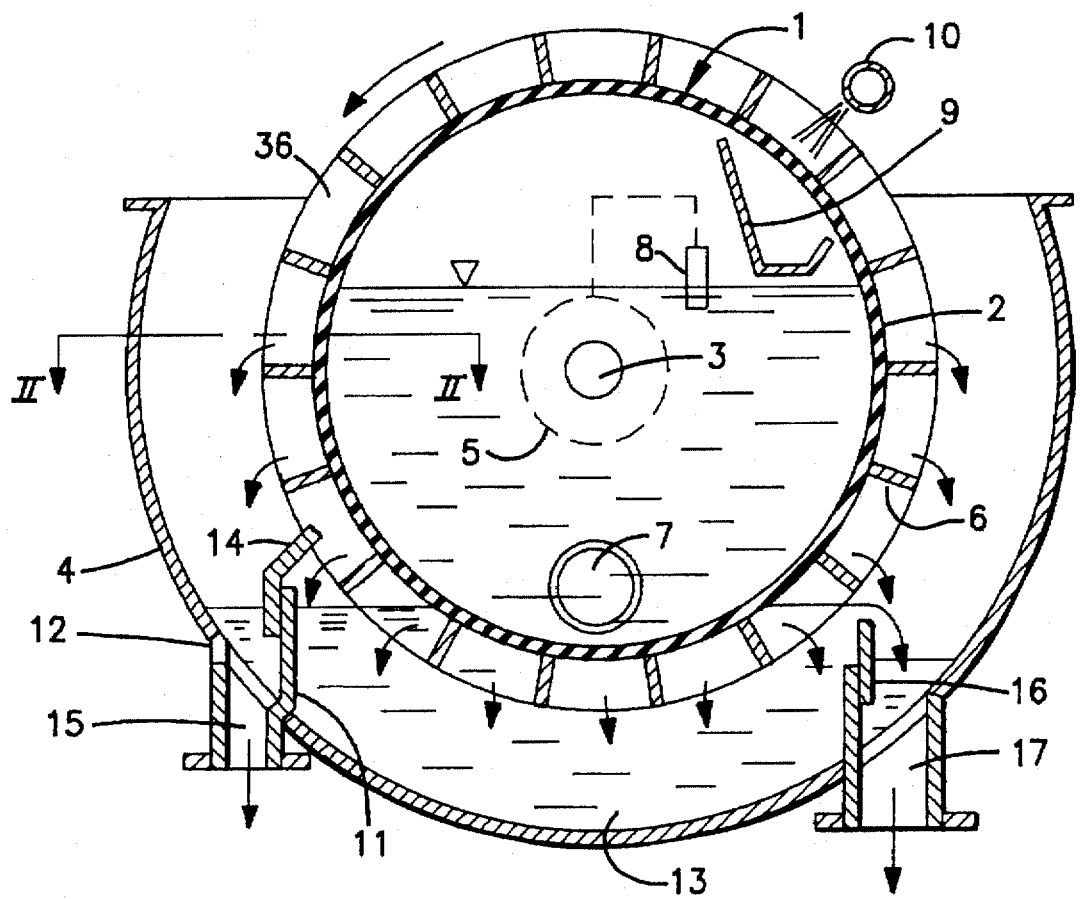
FIG. 1 is a cross-section of a first embodiment of the apparatus of the invention.
Figure 2:
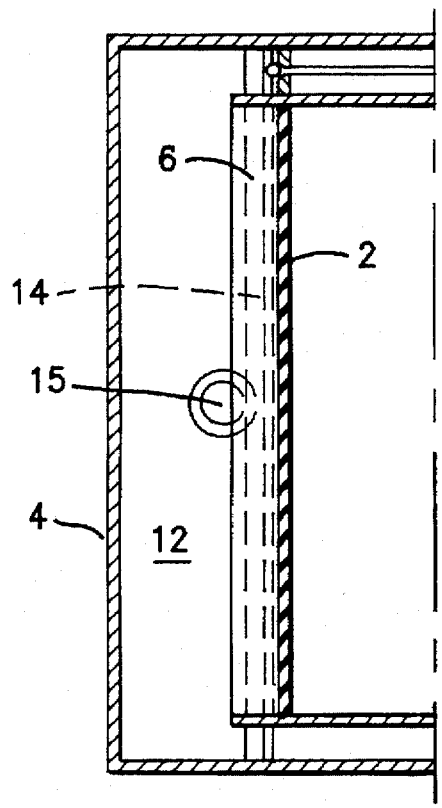
FIG. 2 is a sectional view from above along line II—II of FIG. 1.

FIG. 1 shows a filtering apparatus comprising a hollow body in the form of a drum 1 with a mantle of filter material 2. The drum 1 is rotatable about a horizontal axis 3 and arranged in a container 4. A drive means 5 is provided for rotating the drum 1 about the axis 3 in an anti-clockwise direction as shown in FIG. 1. The mantle of the drum 1 is provided with eighteen guide members 6 distributed evenly around the drum 1 and extending radially outwardly from and axially along the drum 1. There is an inlet 7 at the lower part of the drum 1 for supplying liquid to be filtered to the interior of the drum 1. A liquid level sensing means 8 is connected to the drive means 5 for controlling the rotational speed of the drum 1, in order to maintain a pool of the liquid to be filtered within the drum 1, such that the free surface of the pool is kept at a predetermined level below the upper portion of the filter material 2. A chute 9 extends along the mantle of the drum 1 within the drum 1 and above the liquid pool, for receiving particles which are sprayed off the filter material by spray nozzles 10 arranged outside of the drum 1.

The container 4 is divided by a partition wall 11 extending in parallel with the axis 3, such that a basin 12 for receiving cloudy filtrate is formed at the descending side of the drum 1 and a basin 13 for receiving clear filtrate is formed under the drum 1. The partition wall 11 is provided with an adjustable flexible wall member 14 extending into an annular zone 36 along which the guide members 6 are displaced as the drum 1 is rotated. The member 14 is adapted to be bent aside by a passing guide member 6 The basin 12 is provided with an outlet 15 for cloudy filtrate. The basin 13 has an adjustable overflow member 16 at an outlet 17 for clear filtrate.

In operation, the drum 1 is rotated by the drive means 5 and a liquid to be filtered is supplied to the interior of the drum 1 via inlet 7. The liquid level sensing means 8 senses the level of the liquid surface and controls the drive means 5 to increase the rotational speed of the drum 1 if the liquid surface is above a predetermined level and to decrease said rotational speed if the liquid surface is below said predetermined level. (As an alternative, said predetermined level of the liquid surface may be obtained by an overflow for the liquid or by controlling the flow of the liquid supplied to the drum 1.)

At the descending side of the rotating drum 1, a cloudy filtrate penetrates the filter material 2 immediately below the liquid surface and flows by gravity along one or two guide members 6, from which the cloudy filtrate is poured into the basin 12. Cloudy filtrate collected in the basin 12 is discharged through the outlet 15.

As the filter material 2 is displaced further downwards, particles accumulate on the inside of the filter material and form a filter layer, with the result that the cloudy filtrate gets more and more clear and finally is classified as clear filtrate where it penetrates filter material having reached about an eight O'clock position on the drum 1. In this position, the filter material passes the flexible wall member 14, with the result that clear filtrate is received by the basin 13. The overflow member 16 is adjusted in dependence on the kind of liquid which is filtered, so that a desired differential pressure across the filter material is maintained. Clear filtrate collected in the basin 13 is discharged through the outlet 17 via the overflow member 16.

The accumulated particles on the inside of the filter material 2 are sprayed off, as the filter material passes the spray nozzles 10, and are collected by the chute 9. In the chute 9 the particles are immersed in liquid (suitably some of the clear filtrate) from the spray nozzles 10, with the result that the particles flow away along the chute 9 out of the drum 1.

Figure 3:
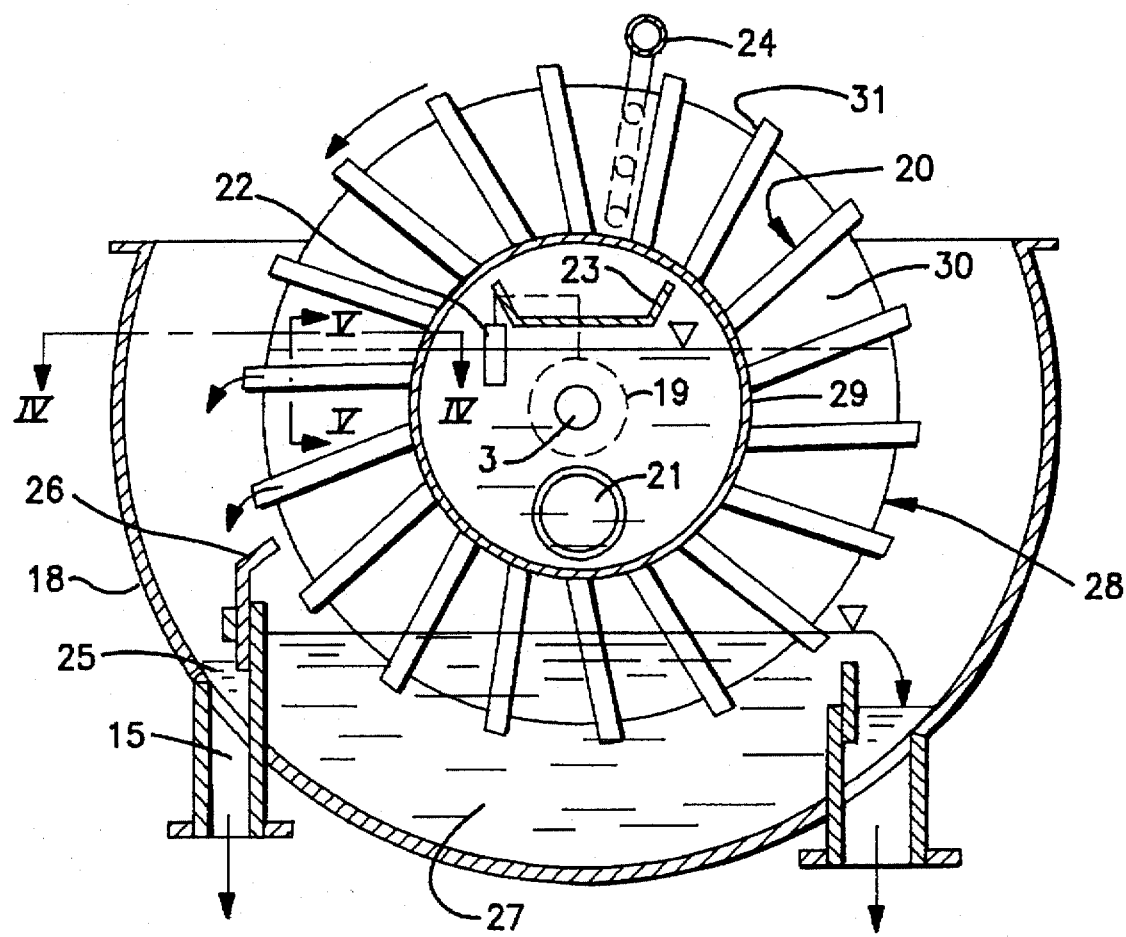
FIG. 3 is a cross-sectional view of a second embodiment of the apparatus of the invention.
Figure 4:
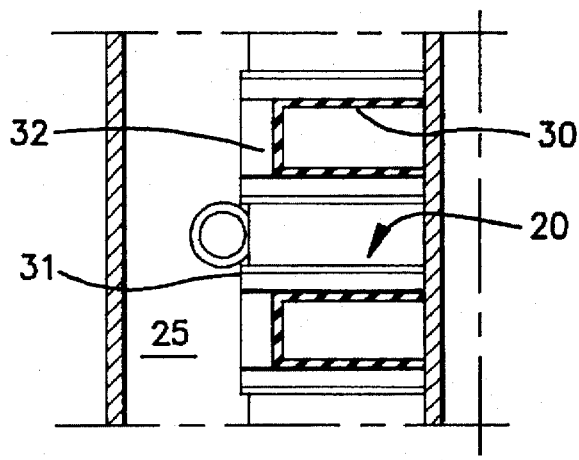
FIG. 4 is a part of a sectional view from above along line IV—IV of FIG. 3.

FIG. 3 shows an apparatus comprising a container 18, a drive means 19, guide members 2C, an inlet 21 for liquid to be filtered, a sensing means 22, a chute 23, spray nozzles 24, a basin 25 for cloudy filtrate, a flexible wall member 26, and a basin 27 for clear filtrate, all the above mentioned components located in like manner to the analogous components described in connection with FIG. 1. The difference between the apparatus shown in FIG. 3 and the apparatus described above in connection with FIG. 1 principally lies in the design of the hollow body. Thus, in the apparatus shown in FIG. 3 the hollow body is in the form of a number of hollow annular disc 28 having a common hollow shaft 29. The side walls of the discs 28 are made of filter material 30 and are provided with the guide members 20. Each guide member 20 is positioned on its disc 28, such that it extends from the hollow shaft 29 forwards in the direction of rotation and has a radially outermost portion 31 extending outwardly from the disc 28. The two portions 31 of two adjacent guide members 20 at mutual sides of a disc 28 are joined by a bridging guide member portion 32 (FIG. 4).

Figure 5:
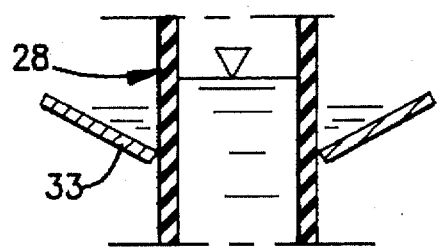
FIG. 5 is a section taken along line V—V of FIG. 3.

Each guide member 20 comprises a flat plate 33 which extends at an angle to the disc 28, such that the plate 33 forms a chute with the disc, as the plate 33 is displaced downwardly at the descending side of the disc 28 (FIG. 5).

Figure 6:
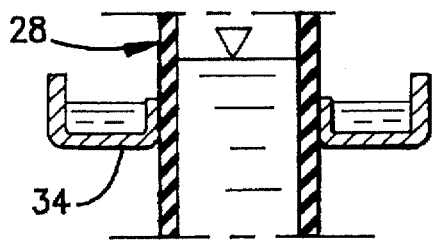
FIG. 6 is a modification of the embodiment shown in FIG. 5.
Figure 7:
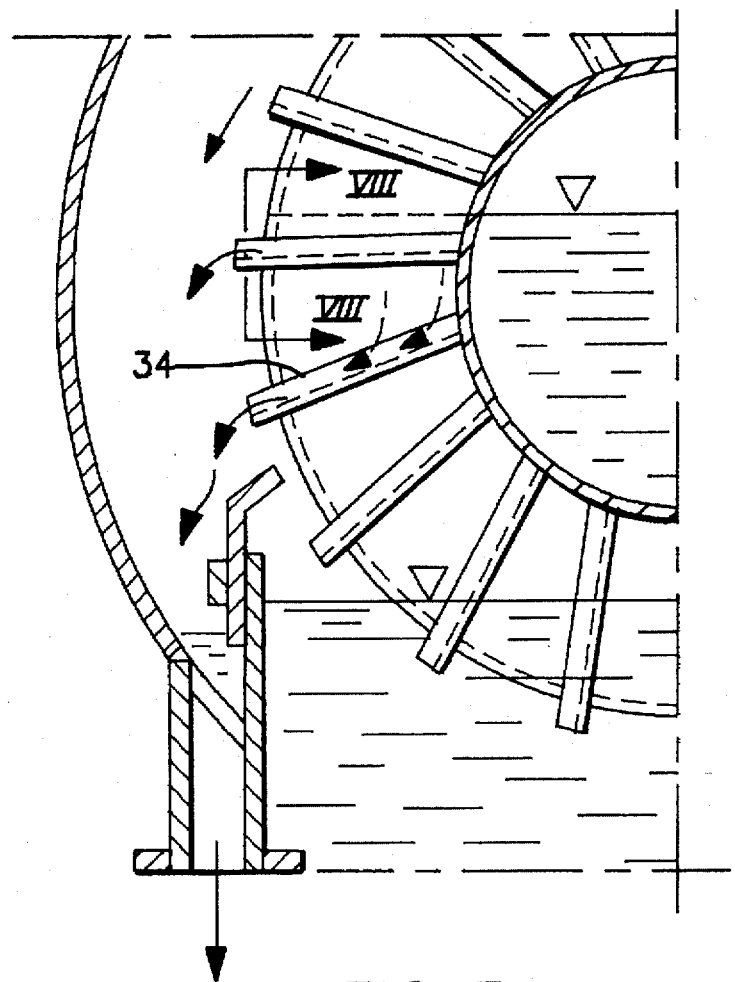
FIG. 7 is an enlarged part of a sectional view of a modification of the embodiment shown in FIG. 3.
Figure 8:
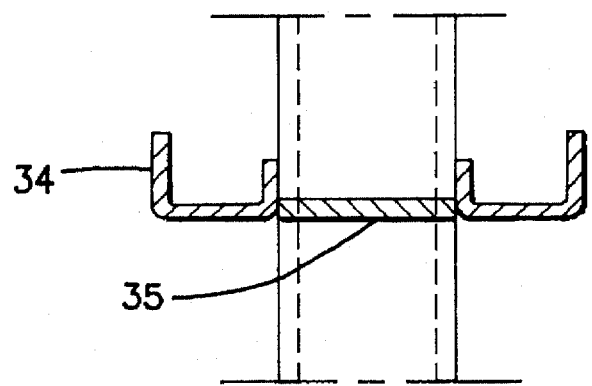
FIG. 8 is a section taken along line VIII—VIII of FIG. 7.

FIG. 6–8 show a preferred modification of the guide member 20 in the form of a U-shaped plate 34. The radially outermost portions of adjacent plates 34 at mutual sides of the disc 28 are joined by a flat plate 35.

We claim:

1. An apparatus for filtering liquids containing particles, comprising:

a hollow body having walls of filter material, drive means arranged to rotate the hollow body such that the walls of filter material are rotated about a substantially horizontal axis, inlet means adapted to supply the liquid to be filtered to the interior of the hollow body, means for maintaining a pool of the liquid in the hollow body, such that the pool has a free surface situated below a top portion of the filter material, a container in which the hollow body is arranged, partition wall means having an upper edge positioned below the horizontal axis of the hollow body, said partition wall means extending in parallel with said axis and dividing the container such that a first basin for cloudy filtrate is formed at the descending side of the hollow body and a second basin for clear filtrate is formed under the hollow body, a cloudy filtrate outlet from said first basin for discharging cloudy filtrate, a clear filtrate outlet from said second basin for discharging clear filtrate, means for removing particles from said top portion of the filter material and for discharging the removed particles out of the hollow body, and a plurality of guide members attached to the hollow body and evenly distributed about said axis, each guide member being adapted to receive cloudy filtrate from a descending portion of the filter material defined by the guide member and an upper adjacent guide member, the guide members being positioned on the hollow body such that the cloudy filtrate received by a descending guide member flows by gravity along the latter in a direction outwardly from the hollow body, said first basin for cloudy filtrate being positioned relative to the hollow body such that is receives cloudy filtrate which is poured from a descending guide member.

2. An apparatus according to claim 1, wherein the number of guide members are in the range of 10 to 36.

3. An apparatus according to claim 1, wherein each guide member has at least a portion extending radially outwardly from the hollow body.

4. An apparatus according to claim 3, wherein said portions of the guide members move along an annular zone as the hollow body rotates, said partition wall means comprising a flexible wall member delimiting the boundaries between said first basin for cloudy filtrate and said second basin for clear filtrate, and said flexible wall member extending into said annular zone and being adapted to be bent aside by a passing guide member.

5. An apparatus for filtering liquids containing particles, comprising:

a hollow body having walls of filter material, drive means arranged to rotate the hollow body such that the walls of filter material are rotated about a substantially horizontal axis, inlet means adapted to supply the liquid to be filtered to the interior of the hollow body, means for maintaining a pool of the liquid in the hollow body, such that the pool has a free surface situated below a top portion of the filter material, a container in which the hollow body is arranged, a partition wall extending in parallel with said axis and dividing the container such that a first basin for cloudy filtrate is formed at the descending side of the hollow body and a second basin for clear filtrate is formed under the hollow body, a cloudy filtrate outlet from said first basin for discharging cloudy filtrate, a clear filtrate outlet from said second basin for discharging clear filtrate, means for removing particles from said top portion of the filter material and for discharging the removed particles out of the hollow body, and a plurality of guide members attached to the hollow body and distributed about said axis, each guide member arranged to guide cloudy filtrate penetrating the filter material at the descending side of the rotating hollow body to said first basin for cloudy filtrate, each guide member having at least a portion extending radially outwardly from the hollow body, said portions moving along an annular zone as the hollow body rotates, said partition wall comprising a flexible wall member delimiting the boundaries between said first basin for cloudy filtrate and said second basin for clear filtrate, and said flexible wall member extending into said annular zone and being adapted to be bent aside by a passing guide member.

* * * * *